Aug. 5, 1958  A. K. PEILER  2,845,660
METHOD FOR MAKING LEAD-IMPREGNATED PLASTIC ARTICLES
Filed Feb. 9, 1956
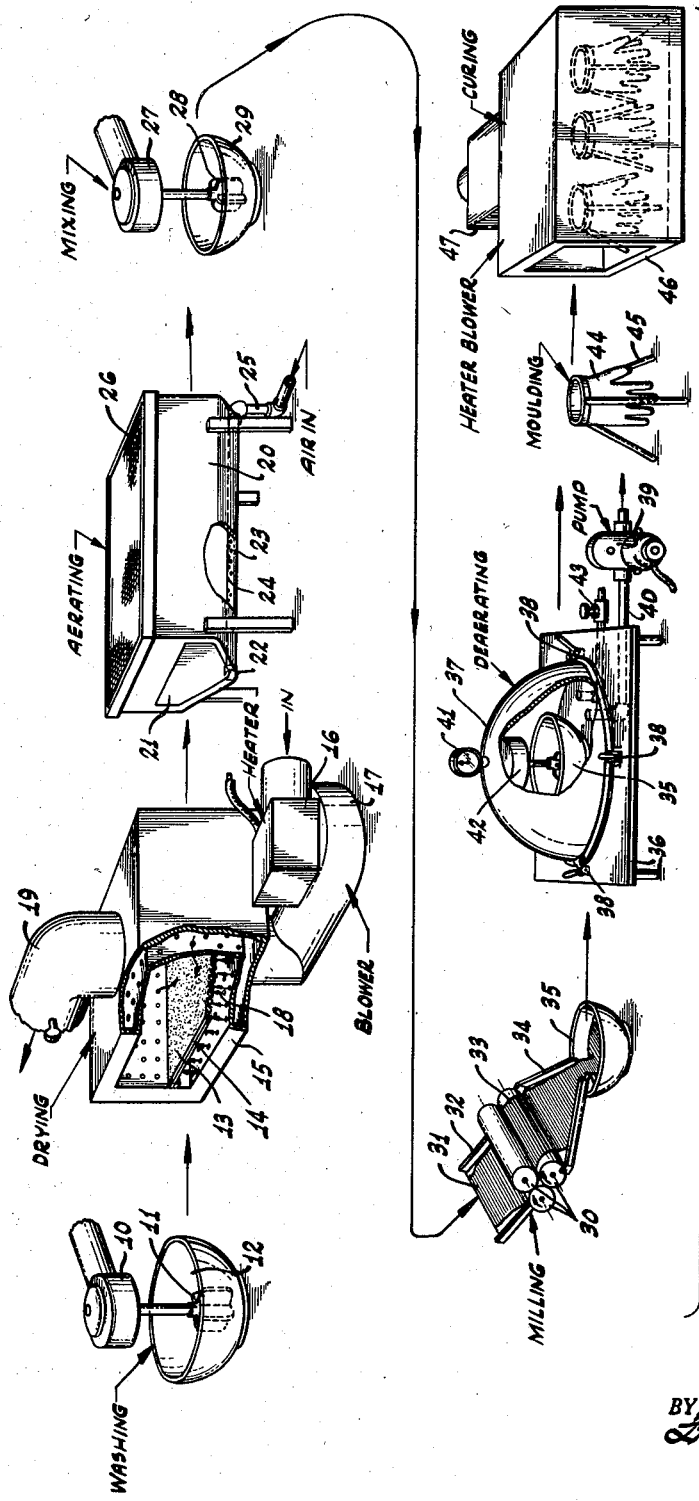
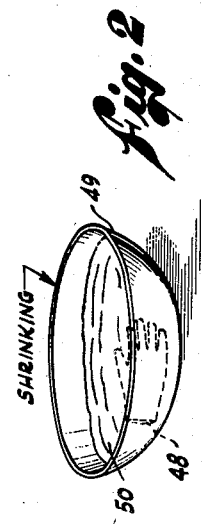
INVENTOR.
ALVA K. PEILER
BY
ATTORNEYS

United States Patent Office 2,845,660
Patented Aug. 5, 1958

2,845,660

METHOD FOR MAKING LEAD-IMPREGNATED PLASTIC ARTICLES

Alva K. Peiler, Glendora, Calif., assignor to Alice B. Maxam

Application February 9, 1956, Serial No. 564,513

6 Claims. (Cl. 18—58.6)

This invention relates generally to the fabrication of articles of lead-impregnated, rubber-like plastic, and more particularly to a method in which lead powder is washed and aerated prior to mixing with liquid plastic, and the mixture is de-aerated under vacuum before molding into a desired article.

Lead-impregnated rubber gloves and aprons have been used by X-ray technicians for many years to avoid dangerous sores and tissue destruction which result from too frequently repeated exposure to X-ray. Some use has also been made of lead-impregnated articles for use with highly corrosive acids, for example, in bottle stoppers and tubing. In the manufacture of such articles, it has heretofore been the practice to beat powdered lead into a natural or synthetic rubber liquid, and mold and cure with the lead suspended therein. There has always been the problem, however, that the powdered lead tended to settle from the liquid rubber, and it has been very difficult to produce an article with sufficient concentration of lead and homogeneity of distribution for reliable protection against X-ray, or resistance to attack by acids.

One common method of manufacture designed to overcome these difficulties has been to make thin lead-impregnated sheets, and then cement these into laminations of the desired thickness. Since lead can be absorbed into the body through contact with the skin, with dangerous consequences, gloves and aprons have heretofore been generally made in thick laminations with surface laminations of pure rubber cemented to the inner laminations of lead-impregnated material. These articles have always been subject to the objection that they were extremely bulky and thick, weighing down the wearer, and interfering with movements or manipulations attempted while wearing them. Heavy lead-impregnated aprons and gloves must be handled carefully because of their tendency to crack, and must carefully be inspected at frequent intervals because of the tendency to develop hairline splits and pin holes which subject the wearer to the danger of exposure of which he is not aware. To some extent, the tendency to deteriorate, and develop stiffness and defects, has been traced to corrosive impurities in the powdered lead, and in some cases, expensive measures have been taken to purify the lead powder.

Some advances have been made by using plastic materials, such as vinyl resins, instead of rubber. Heretofore however, there have always been stringent limitations on the amount of lead powder which could be suspended in the liquid plastic prior to molding. The great density of lead seemed an insurmountable barrier to any lead-impregnated plastics above a relatively low density limit. In plastics, as in rubber, the passage of a few months generally brought stiffening, general deterioration, cracking, and a tendency to pinhole.

It is a major object of the present invention to produce a lead-impregnated plastic of higher lead concentration than lead-impregnated plastic and rubber heretofore known.

It is a further object of the invention to produce a permanently flexible tough material, resistant to cracking, holes and wear.

Still another object is to produce a lead-impregnated plastic in which high concentration of lead and lead-free surfaces are obtained without resort to lamination.

Another objection of this invention is to provide a method for incorporating powdered lead in liquid plastic before molding, in such a manner that the suspended lead remains uniformly distributed throughout the liquid, without appreciable settling for several hours or several days.

Still another object is to provide a method for making lead-impregnated plastic articles of high density by shrinking articles made according to the present invention.

The foregoing and other objects of the invention are accomplished by preparing a suspension of powdered lead in liquid plastic prior to molding by mixing the liquid mixture of resin and plasticizer with powdered lead which has been washed and aerated in the manner described herein, to facilitate the formation of a homogeneous mixture. Mixing is followed by milling, and subsequently by extraction of air from the suspension of lead powder in liquid plastic, prior to the molding and curing steps.

A specific embodiment of the invention will be described with reference to the manufacture of lead-impregnated plastic gloves by film coating the interior of a heated glove mold. Naturally, the same method could be applied to the manufacture of other articles; for example, sheets can be made by film coating the surface of a heated slab, in a manner well-known to those familiar with the art of plastic molding. Moreover, the lead-plastic suspension produced as described in the method of this invention may be used in plastic molding generally, for example, for producing hose by extrusion.

The process as applied to glove making is illustrated in the accompanying drawings, in which:

Figure 1 is a pictorial representation of the steps in the method of the invention; and Figure 2 is a pictorial representation of the shrinking process which may be applied to increase the density of lead content, or to produce gloves of smaller size from a given molded size.

In Figure 1, the step of washing the powdered lead is represented by a motor driven mixer 10 with paddles 11 positioned in the lower part of a mixing tub 12. In this step, powdered lead is stirred with water for several minutes until thoroughly wetted, then allowed to settle, and the water is poured off. The powdered lead must have been screened to a fineness of 400 mesh or finer, but it is much preferred to use 600 mesh or finer. Preferably, the powder should be 98% lead, and certainly at least 90%. However, it is generally not economically justified to use lead powder which has been refined any further than the ordinary commercial powdered lead sold for general use.

The principal purpose of the washing step is to remove arsenic salts, which have two adverse effects, first on the stability of the suspension of lead powder in the liquid plastic and second on the stability of the plastic article produced. In general, washing should be repeated as often as is necessary to reduce the arsenic content to so small an amount that no powder crystals of arsenic salts appear on the washed lead powder after it is dried. Most commercial lead powder requires two washings in distilled water to sufficiently eliminate arsenic compounds.

Of course, it is not necessary to rely on the visible appearance of arsenic crystals. The wash water after each washing may be tested with litmus paper, alizarin crimson, methylene blue, or other arsenic tests to determine quantitatively whether or not the lead powder has been freed of arsenic to the extent required for the particular application.

After the lead powder has been washed one or more times as required, it is dried in a current of hot air, preferably laid out on a thin layer 13 on a cloth tray 14 supported in a hot air furnace 15. A heater 16 and blower 17 pass the hot air up through the layer of lead 13 as indicated by the arrows 18, air and vapors being exhausted from the furnace 15 by way of stack 19.

The dried lead powder is next put in an aerating bin 20 through a door 21. The bottom of the aerating bin 20 is preferably V-shaped in vertical cross section, so that the powder tends to concentrate at the V intersection 22, along the lowest point of the bin.

An aerating pipe 23 lies along the length of the bin 20 in the V intersection 22, and is provided with a large number of fine perforations 24 along the upper edge so that air introduced under pressure at 25 entrains the lead powder and carries it upwardly toward the top of the bin 20, which is covered by a cover 26 comprised of one or more layers of fine mesh screen or silk. Cover 26 permits the escape of the air, while retaining the lead powder. Aeration is carried on until the lead powder is fluffed to a uniform light consistency; this usually requires about five minutes.

After aeration, the lead powder is ready for mixing with the liquid mixture of resin and plasticizer. The lower molecular weight polyvinyl chloride polymers in plastisol or organisol form are outstandingly superior for this purpose. Such low molecular weight resins are sold by the B. F. Goodrich Company under the trade designation Geon 121 and by the Dow Chemical Company under the designation X 2702. A suitable plasticizer oil is mixed with the resin. Preferred plasticizers for use with the preferred polyvinyl chloride resin are diabutyl phthalate, tricresyl phosphate, or dioctyl phthalate. The mixture should be between 40 and 80 parts of resin in every one hundred parts of mixture, but preferably about 60 parts of resin to 40 parts of plasticizer oil.

It will be found that the washed and fluffed lead powder can be mixed with the resin-plasticizer mixture to produce a lead-impregnated liquid of homogeneous consistency, and highly resistant to settling of the lead powder from the liquid. Mixing is indicated by motor driven mixer 27 with its mixer paddle 28 positioned in the mixer 29. This preliminary mixing step is usually carried out in a mixer open to the atmosphere, and continued for a period of about twenty minutes. It will usually be found that about 100 pounds of lead will require about 25 pounds of liquid mixture for the most satisfactory results. However, the range of plastic mixture which may be used is between about 8 pounds and about 50 pounds of liquid for each 100 pounds of lead, and this range of weight proportion seems to hold regardless of which resin and which plasticizer is employed.

By far the best results in forming this mixture are achieved by placing all the vinyl in the mixer tub 29 and then, after starting the rotation of the mixing paddle 28, gradually adding the lead powder while stirring. This usually requires about five to six minutes, and mixing should be continued for about twenty minutes after all the lead powder has been added until a homogeneous black viscous mixture is obtained.

Any remaining tiny lumps or irregularities are removed by subjecting the mixture to a milling process. In its simplest form, milling consists of merely working over the mixture with a spatula on a hard smooth surface. Quantities are more efficiently handled by passing the mixture through three milling rolls as indicated in the drawing at 30. For example, three stainless steel rollers, arranged in pyramid manner as shown at 30, two inches in diameter and three feet long provide a practical mill for continuously processing small quantities of the lead-impregnated mixture.

The mixture 31 is shown flowing toward the rolls 30 in a trough 32 and emerging in a milled condition at 33, being collected in trough 34 and passed into a mixer tub 35 for deaeration mixing.

The milled liquid must next be stirred under substantial vacuum to remove the air content introduced during the aeration step preliminary to the first mixing. Otherwise, the occluded air evolves during molding and curing with destructive consequences to the plastic article.

The mixer tub 35 is placed on a table 36 and a bell cover 37 is placed over it and clamped to the table in airtight contact by means of clamps 38. A pump 39 is used to evacuate air from under bell cover 37 by way of pipe 40. While a vacuum of at least fifteen inches of mercury and preferably about 29 inches of mercury, or about one-half pound pressure per square inch, is maintained under bell cover 37, the mixture in mixing tub 35 is stirred by means of mixer 42, until foaming of the mixture discontinues, which usually occurs after the lapse of about one hour. Vacuum pump 39 is stopped and valve 43 is opened to re-admit air under bell cover 37.

The deaerated mixture is next poured into a metal mold 44 (for example plated copper or nickel), which has been heated to a temperature of about 350° F. or at least in a range between 250° F. and the break-down temperature of the components of the plastic mixture. After filling, the liquid mixture is poured back into mixing tub 35 leaving a thin coating of solidified lead-impregnated plastic lining in the mold 44.

The molded article is next cured by placing mold 44, and its supporting tripod 45 in a hot air furnace 46, which is provided with a heater blower 47. Most of the plasticizer oil is evolved and carried off, and within a few minutes the mold 44 may be removed from the oven 46 and the finished glove pulled out of the mold.

However, the thickness of the glove may be built up if desired, by returning the mold 44 to the molding step without removing the cured glove, and once again filling the glove and mold with liquid plastic. Also, it is usually desirable in these gloves to prevent contact of the lead powder with the skin of the wearer so that it is desirable to lay down at least three layers of plastic, the first one being pure plastic to provide a lead-free lining. The same procedure may be pursued with other articles to accomplish the same result of providing lead-free outer surfaces.

It will be understood, of course, that if the lead-impregnated plastic mixture is poured in and out of mold 44 several times, it picks up substantial amounts of air, and must be returned to deaerating step for deaerating under vacuum.

If desired, the density of lead content may be much increased (although the glove is made somewhat stiffer) by subjecting it to the shrinking process represented by the illustration of Figure 2. The completed glove 48 is placed in a container 49 and soaked in a solvent for the plasticizer material, such as toluene, to cause it to shrink in size and become denser.

In an actual application of the method of the present invention, one hundred pounds of commercial powdered lead, six hundred mesh or finer, and over 99% pure lead, is mixed with five gallons of distilled water and stirred for ten minutes. The water was poured off, and another five gallons of distilled water was added and the stirring repeated. The water was again poured off, and tested with litmus paper. A fairly strong arsenic content was indicated, so that the powdered lead was subjected to a third washing.

The wet powdered lead was spread in a layer of about one quarter inch deep over a cloth tray and placed in a hot air drying oven, as illustrated in Figure 1 at 15, and dried for twenty minutes.

The washed and dried powdered lead was then subjected to aerating as previously described for six minutes.

A mixture of fifteen pounds of polyvinyl chloride (Geon 121) and ten pounds of dibutyl phthalate plasticizer oil were thoroughly mixed and placed under a stirrer. The hundred pounds of washed and aerated lead were gradually added to the plastic mixture over a period of six minutes, and thereafter stirring was continued for a period of twenty minutes.

The air-filled mixture of lead powder and plastic mixture was then milled as described in connection with the figures and passed to deaerating. Atmospheric pressure was 30 inches of mercury, and a vacuum of 29 inches of mercury was established under the bell cover 37. Mixture was then stirred for sixty-five minutes while the vacuum was maintained. Toward the end of that time no foaming was observed.

A second plastic mixture containing the same resin and plasticizer in the same proportions was prepared, but without any lead content.

A glove mold 44 was then heated to 400° F., filled with lead-free plastic mixture, and shaken a little. The plastic mixture was then poured off and the mold passed through the curing oven 46 where it was cured at a temperature of 350° F. for a period of thirty minutes.

The mold 44 was then removed from the drying oven and, while still at a temperature of 350° F., was filled with the lead-impregnated plastic mixture. The mixture was then promptly poured out, and the mold was returned to the curing step for fifteen minutes.

The sequence of film coating and curing was then repeated three more times, twice with lead-impregnated plastic mixture, and finally with a lead-free coating.

Some of the gloves so produced were soaked in toluene for a period of four minutes to slightly shrink them and increase their density.

Various modifications of my invention will suggest themselves to those skilled in the art. I accordingly desire that in construing the breadth of the appended claims that they shall not be limited to the specific details shown and described in connection with the above specification.

I claim:

1. A method for making lead-impregnated plastic which includes: aerating clean finely divided dry lead powder to impart to it a fluffed, relatively light consistency; mixing said lead powder in an aerated condition with a liquid plastic mixture; subsequently removing occluded gas from said mixture by agitating it under a vacuum; and molding the deaerated liquid mixture to desired shape.

2. A method for making lead-impregnated articles, which includes: slurrying powdered lead with water, said powder being at least 400 mesh or finer, and having a lead content of at least 90%, and thoroughly mixing to wash arsenic impurities out of said powder; drying said lead powder; fluffing said lead powder to a relatively light consistency by subjecting it to aeration with a suspending gas; forming a liquid mixture of plastic resin and plasticizer, and while continuously agitating said mixture, gradually adding said fluffed lead powder thereto; milling said last-produced mixture to improve its consistency; agitating said liquid mixture under a vacuum of at least 15 inches of mercury until foaming of said mixture by the evolution of gas is substantially discontinued; and utilizing said deaerated plastic-lead mixture for molding said lead-impregnated plastic articles.

3. A method for making lead-impregnated plastic articles which includes: slurrying 100 parts by weight of powdered lead comprised of at least 90% lead, 400 mesh or finer with distilled water and thoroughly mixing to wash out residual arsenic content; rewashing until arsenic content is so low that no visible white crystals appear in lead powder upon subsequent drying; passing heated air through thin layers of said washed lead powder to remove traces of moisture; entraining said lead powder in a current of air to thoroughly aerate it; mixing said aerated lead powder with between 8 and 50 parts by weight of plastic mixture comprised of vinyl resin and plasticizer; milling said mixture to reduce irregularities in consistency; stirring said milled mixture under an absolute pressure of less than one-half pound per square inch until foaming discontinues, to deaerate said mixture; and molding said liquid mixture into a plastic article.

4. A method for making lead-impregnated plastic articles which includes: repeatedly washing powdered lead 600 mesh or finer with distilled water until tests for arsenic content indicate that it does not exceed a predetermined allowable maximum; passing heated air through said washed lead powder to remove traces of moisture; entraining said lead powder in a current of gas to thoroughly aerate it; mixing said aerated lead powder with between 8 and 50 pounds of plastic mixture comprised of vinyl resins and plasticizer for each 100 pounds of powder; milling said mixture to reduce irregularities in consistency; stirring said milled mixture under an absolute pressure of less than one-half a pound per square inch until foaming discontinues, to deaerate said mixture; coating a heated mold surface with said mixture; and heating said cooled article in a stream of hot air to cure said plastic article.

5. A method for making lead-impregnated plastic articles which includes: slurrying powdered lead comprised of at least 90% lead 600 mesh or finer with distilled water and thoroughly mixing to wash out residual arsenic content until residual arsenic is not greater than an allowable maximum; contacting said washed lead powder with hot gas to remove traces of moisture; entraining said lead powder in a current of gas to thoroughly aerate it; mixing said aerated lead powder with between 8 and 50 pounds of plastic mixture comprised of vinyl resins and plasticizer for each 100 pounds of powder; milling said mixture to reduce irregularities in consistency; stirring said milled mixture under a vacuum of at least fifteen inches of mercury until foaming discontinues, to deaerate said mixture; coating a hot mold with lead-free vinyl plastic and curing; coating said coating at least once with said deaerated lead-plastic mixture and curing; again coating with lead-free vinyl plastic to produce a lead-impregnated article with lead-free surfaces.

6. A method for making lead-impregnated articles, which includes: slurrying powdered lead with water and thoroughly mixing to wash arsenic impurities out of said powder; drying said washed lead powder; fluffing said dry lead powder to a relatively light consistency by subjecting it to aeration with a suspending gas; forming a uniform liquid mixture of plastic resin, plasticizer, and said fluffed lead powder; agitating said liquid mixture under reduced pressure to substantially deaerate said mixture; and utilizing said deaerated plastic-lead mixture for molding said lead-impregnated plastic articles.

References Cited in the file of this patent

UNITED STATES PATENTS

| | | |
|---|---|---|
| 2,309,571 | Bruce et al. | Jan. 26, 1943 |
| 2,441,945 | Frolich et al. | May 25, 1948 |